June 23, 1953
I. J. AMO
2,642,621
APPARATUS AND METHOD FOR PRODUCING
DISK PHONOGRAPH RECORDS
Filed Dec. 28, 1950
3 Sheets-Sheet 3
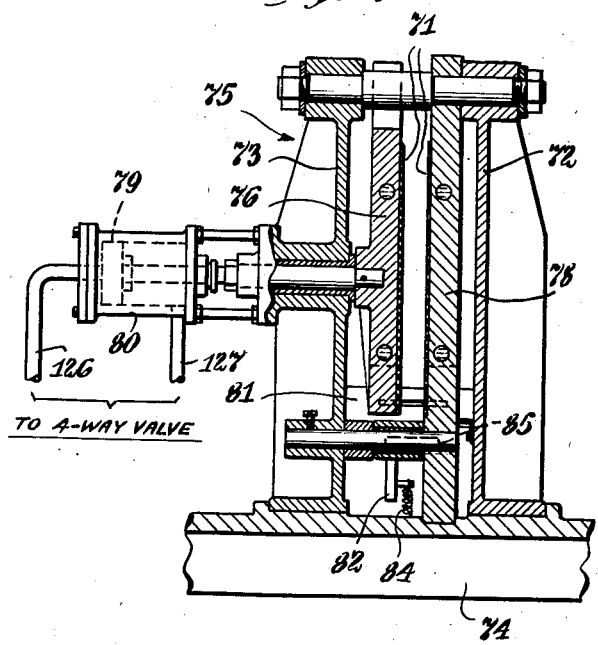
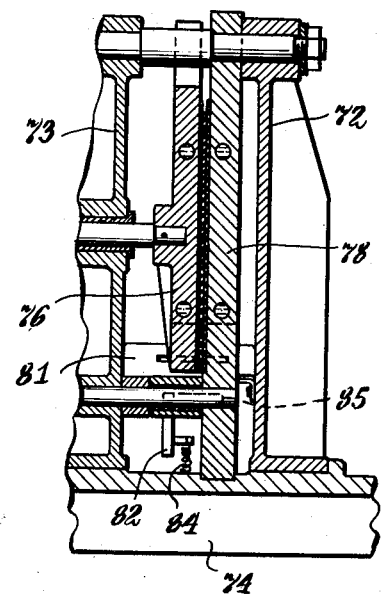
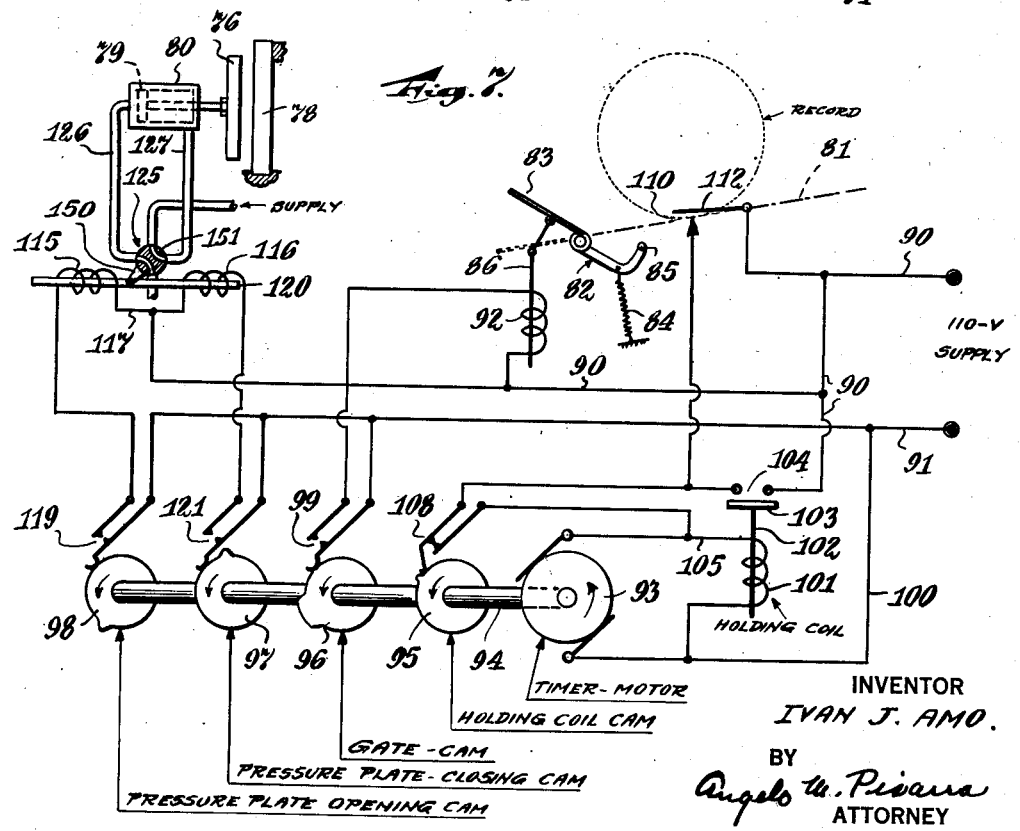
INVENTOR
IVAN J. AMO.
BY
Angelo M. Pivarra
ATTORNEY Patented June 23, 1953

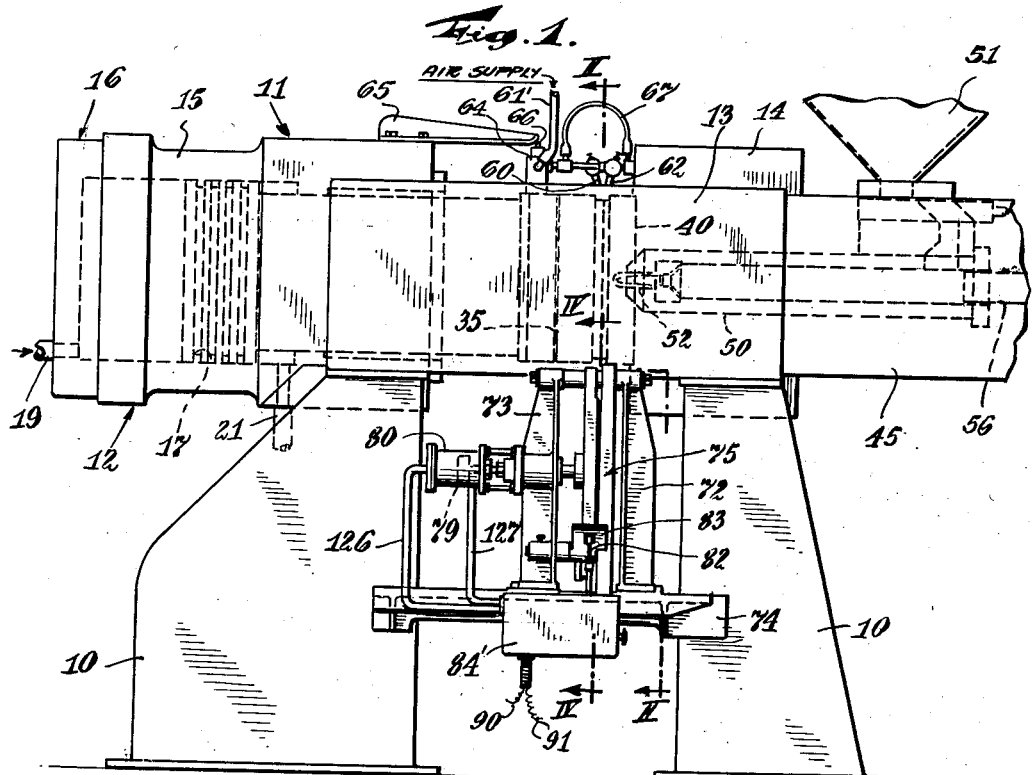

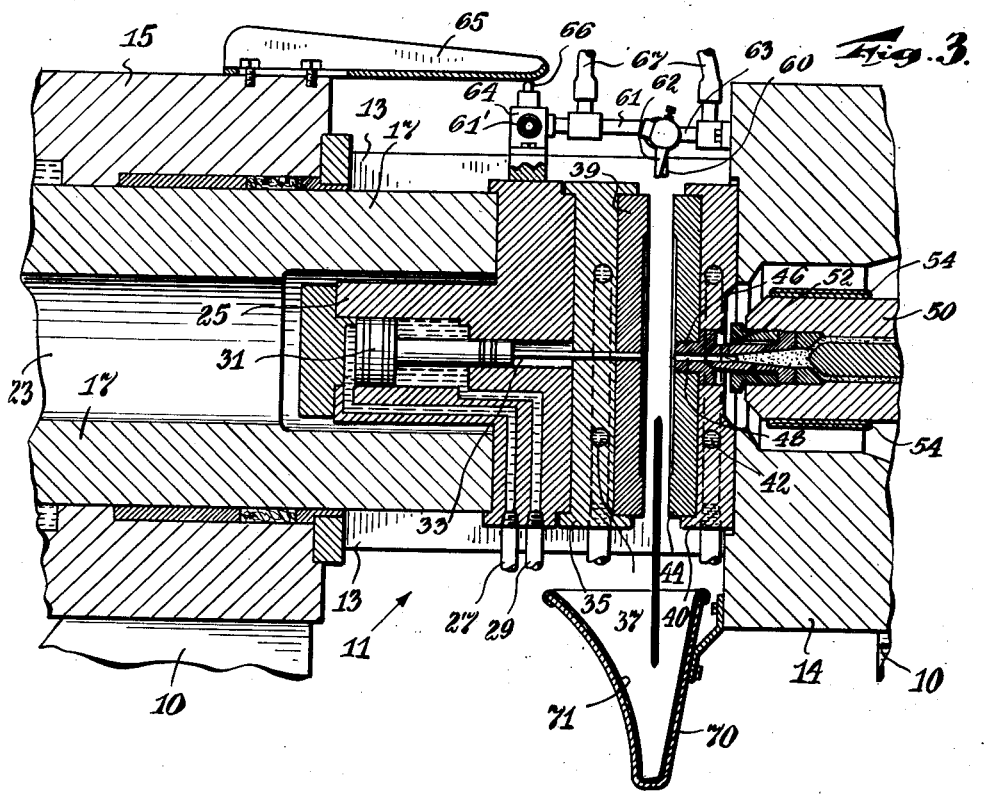
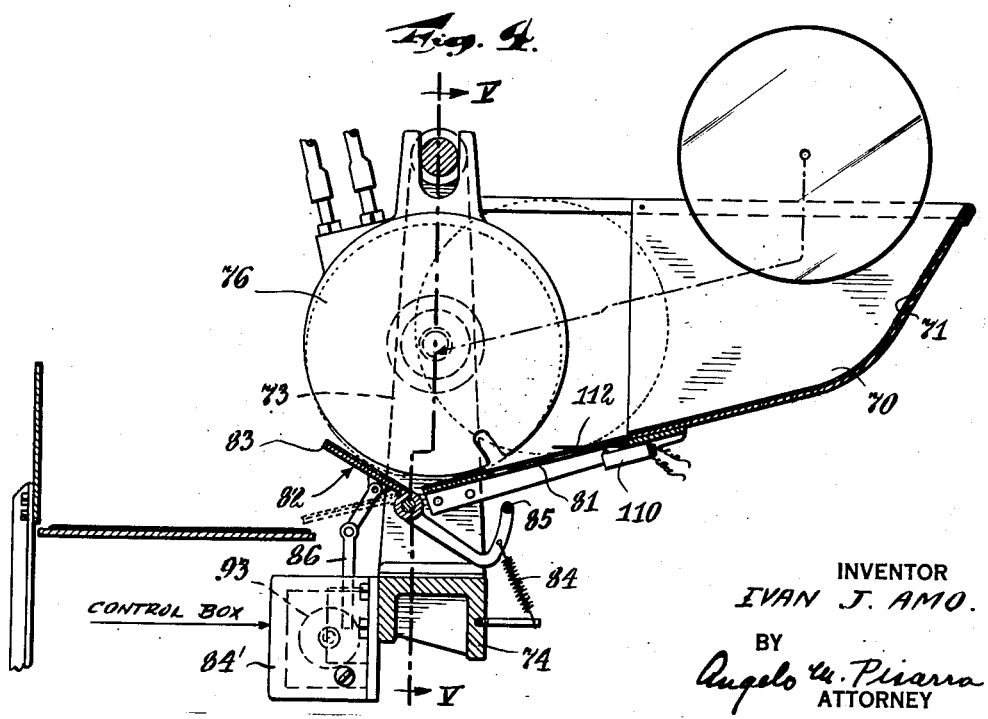

2,642,621

UNITED STATES PATENT OFFICE 2,642,621

APPARATUS AND METHOD FOR PRODUCING DISK PHONOGRAPH RECORDS

Ivan J. Amo, North Plainfield, N. J., assignor to M & W Company, Inc., Newark, N. J., a corporation of New Jersey Application December 28, 1950, Serial No. 203,065

12 Claims. (Cl. 18—5.3)

This invention relates to novel methods and apparatus for producing disc phonograph records. More particularly the invention is directed to novel methods, steps in the methods, apparatus and subcombinations thereof for the production of disc phonograph records.

One of the main purposes of this invention is to provide novel methods and apparatus for efficiently producing high precision disc phonograph records at high speed in factory production.

The various advantages of this invention will be obvious from the following description and accompanying drawings, wherein:

Fig. 1 is a front elevation view with the dies as well as the clamping mechanism being in closed position.

Fig. 2 is a cross-sectional view taken on line II—II of Fig. 1.

Fig. 3 is an enlarged longitudinal cross-sectional view showing the relationship of some of the various parts, with the dies being separated from each other and the record being discharged from the injection molding machine.

Fig. 4 is a cross-sectional view taken on line IV—IV of Fig. 1, but with the clamping plates open and the finished record delivered to a conveyor belt.

Fig. 5 is a cross-sectional view taken on line V—V of Fig. 4 with the clamping plates in open position.

Fig. 6 is a cross-sectional view similar to Fig. 5 but showing the clamping plates in closed position.

Fig. 7 is a diagrammatic view and is essentially a wiring diagram and mechanism for controlling the cooling and clamping mechanism.

As shown in the drawings, there are a pair of spaced supporting standards 10 secured to the floor and extending upwardly therefrom. Disposed substantially horizontally and mounted on said standards 10 is an injection molding machine 11. The injection molding machine 11 comprises a unitary casting 12 having a pair of supporting frame or tension members 13, an abutment platen 14 extending across the space between the spaced tension members 13 disposed parallel to each other and a clamping cylinder 15. A cylinder head 16 is secured to the cylinder 15 to close it. The abutment platen 14, integral with the tension members 13, is at right angles to said members 13 and has its center line approximately parallel to the longitudinally center lines of members 13 and coincidental with the longitudinal center line of the cylinder 15. Slideably mounted in the cylinder 15 is a piston ram or clamping ram 17. The head 16 of the cylinder 15 has a port 19 therein for the admission of fluid under pressure into said cylinder. There is a port 21 at one side of the cylinder 17 for the flow of a fluid under pressure into said cylinder. By regulating and controlling the flow of fluid into and out of the cylinder 15 through the ports 19 and 21, the piston ram 17 may be moved away from and towards the closed ends of the cylinder 15. The ram 17 has an elongated well 23 therein at the forward end thereof. Located in said well is a cylinder 25 having inlet and outlet ports 27 and 29 for the passage of fluid under pressure therein to actuate a piston 31 located in said cylinder. Piston 31 carries a ram rod 33 which serves to punch a central opening through a record and to remove the sprue material. A die head 35 is secured to said cylinder 25 and has a passageway 37 through which may be circulated a fluid at the proper temperature to maintain said head and the material carried thereby at the temperature desired. Demountably connected to the die 35 is a record matrix 39. The die head 35 and the record matrix 39 have openings in registry with each other and through which the ram rod 33 is reciprocable.

Stationary die head 40 is secured to the face of the abutment platen 14 and has passageway 42 for the circulation of fluid to maintain it and a record matrix 44 demountably carried thereby at the desired temperature. Mounted in central openings through die head 40 and matrix 44 is a sprue bushing 46 having an opening 48 therethrough of substantially the same diameter as the ram rod 33, and also having a concave semi-spherical nozzle accommodating recess or seat. An injection chamber 50 is mounted horizontally for limited slideable movement on side plates 45 rigidly secured to platen 14. Chamber 50 has a nozzle 52 whose discharge end is complementary to the seat in the bushing 46 and normally seats therein. The discharge end of the nozzle has an opening corresponding to that of the opening 48 and then enlarges and communicates with the rest of the chamber 50. This chamber is heated by means of heating coils 54 which fuse or melt the thermoplastic material, from which the records are to be made, to the desired injection consistency or softness. The chamber 50 has an opening communicating with a hopper 51 for carrying said thermoplastic material, which is a thermoplastic fusible resinous composition generally in granular form and composed of any of the various vinyl or other normally solid resinous thermoplastic materials which are well known to the resinous art. Mounted in said cylinder is an injection plunger 56 for injecting said material out of the nozzle through the sprue bushing and into the mold cavity when formed.

Fixedly secured to the platen 14 is an air nozzle 60 whose discharge end is located above the matrix 44, and rigidly secured to the cylinder 25 is a separate air nozzle 62 whose discharge end is located above the matrix 39. Also carried by the cylinder 25 is the outlet end of a flexible hose for carrying air under pressure and also a normally closed valve (not shown)

which may be opened by actuation of a control tip 66. The discharge side of the valve is connected to both of the nozzles 60 and 62 by rigid conduits 61 and 63. A flexible conduit 67 communicates with conduits 61 and 63. Carried by the ram cylinder 15 is a stationary trip 65 for actuating the control tip 66.

Rigidly mounted on the front face of the platen 14 and located below the die heads 35 and 40 is a narrow channel inclined chute 70 having an inner lining composed of sponge, soft rubber or the like. The inlet mouth of the chute is located adjacent to and below the opening between the dies 35 and 40 when they are apart. Carried by a pair of standards 72 and 73 mounted on a frame 74 is a cooling clamp 75. As shown in Figs. 5 and 6, the cooling clamp comprises a pair of clamping jaws 76 and 78 having sponge or soft rubber facings 71. The jaw 78 is stationary and the jaw 76 is movable towards and away from the jaw 78 by the actuation of a piston 79 in cylinder 80. Secured to standard 72 is a runway 81 which is inclined and extends below the clamping jaws 76 and 78 at one end and underlaps the discharge incline end of chute 70. A lever 82 is centrally pivoted on an ear carried by the platform 81 at the lower end thereof.

The front end of lever 82 carries a closure gate 83 normally maintained in its upper and operative position across the space between the clamping jaws 76 and 78 by the tension spring 84. The other arm of lever 82 carries an ejector cross pin 85, normally maintained in inoperative position by spring 84. The lever 82 is actuable by the action of a solenoid core 86 to pivotally actuate lever 82 against the action of spring 84 to lower gate 83 to inoperative position and to swing the pin 85 through a slot in platform 80 and a slot in the lower end of the clamp to strike the edge of the finished record and push it out of the space between the jaws 76 and 78 when open.

A timing and control mechanism for the lever 82 and the piston 79 is carried by a control box 84. As shown in Fig. 7, this mechanism includes a pair of conductors 90 and 91 for connection to a source of electrical supply. A timer motor 93 has a shaft 94 carrying a holding coil cam 95, a gate cam 96, a pressure plate opening cam 97 and a pressure plate closing cam 98. A solenoid winding 92 for the actuable core 86 is shunted across the leads 90 and 91 and this shunt circuit is made at predetermined intervals by closing of the normally open switch 99. A conductor 100 is connected to a terminal of timing motor 93, and also to one end of the solenoid winding 101 of a holding coil having a core 102 carrying a bridge 103 for the contacts of normally open switch 104. A conductor 105 is connected to the other end of winding 101 and to the other terminal of motor 93 and also to a contact of a normally closed switch 108. The other contact of switch 108 is connected to a contact of switch 104 and to the stationary contact of a normally open microswitch 110. The lead 90 is connected to an actuable contact 112 of switch 110 and to the other contact of switch 104.

A pair of solenoids 115 and 116 are connected in series through a conductor 117 connected to lead 90. The other end of solenoid winding 115 is connected to a contact of a normally open switch 119, and the other contact of said switch is connected to lead 91. The other end of the winding 116 is connected to a contact of a normally open switch 121 whose other contact is connected to lead 91. A common solenoid core 120 extends through winding 115 and 116 for controlling a valve 125 which controls the operation of the piston 79 through the fluid conduits 126 and 127 communicating with the cylinder 80.

The operation of the injection molding machine 11 is as follows. With the parts disposed in their relative positions as shown in Fig. 3, the die is completely open and the movable die head 35 is located in its maximum retracted position. The following cycle, which may be made automatically by the employment of appropriate mechanisms, may be repeated time after time and occurs in the following general manner. Fluid under pressure is admitted through port 19, while port 21 is on exhaust, to the ram cylinder 15 to cause clamping ram 17 together with parts operatively connected thereto, to move towards the platen 14. In this manner the matrices 39 and 44 kiss and are maintained under appropriate clamping pressure. Simultaneously with the building up of the clamping pressure between the dies pressure is applied to the nozzle head 52 to seat and maintain it firmly in the concave seat of the sprue bushing 46 to prevent leakage of plastic material at this juncture. While the dies 35 and 40 are maintained in this condition and the nozzle 52 in that condition with respect to sprue bushing 46, the injection plunger 56 is moved, whereupon, the granular fusible thermoplastic resinous material fed to the injection chamber from the hopper compresses the loosely compacted material to first close off the passageway from the hopper to the injection chamber and continues on to further compact the material and to apply pressure to the portion thereof located at the discharge end thereof. This material located at the discharge end of the nozzle has been softened and its viscosity has been reduced to the desired degree. The pressure from the injection plunger is transmitted thereto, whereby the softened or heated plasticised thermoplastic material at the lower end of the injection cylinder is forced through the nozzle, the sprue bushing 46 and into the mold cavity formed by the dies to completely fill that mold cavity. These dies are maintained at a predetermined pressure and their temperature is controlled by the passage of fluid through the ports leading to passageways 37 and 42. This condition is maintained for a period which may be termed the curing cycle, whose time is dependent upon the various conditions involved. After a predetermined increment of that curing period has elapsed, fluid under pressure is admitted through port 27 while port 29 is on exhaust to actuate cylinder 31 to drive the ram rod 33 through the partially cured record, thereby punching a clean record-opening through the center thereof and pushing the sprue material up through the bushing 46 and into the discharge end and beyond the outermost limit of the nozzle 52. This material, which has been relocated in the lower end of the nozzle 52, of course, is again and further softened due to the heat from the heating elements 54 and is redischarged together with additional like thermoplastic material in the next cycle in the preparation of the next record. The dies are maintained under heavy pressure and the nozzle is also continuously maintained against the seat of the bushing 46 even during that period that the ram rod 33 is making its forward movement and also during the period that the ram rod 33 is being retracted, which occurs after the ram rod has reached its maximum forward position by placing the port 27 on exhaust and supplying fluid under pressure through the port 29. When the ram rod 33 reaches its maximum retracted position, the port 19 is placed on exhaust and fluid under pressure is supplied to port 21 to retract clamping ram 17 and its associated parts to its maximum retracted position. In the course of this travel the dies become spaced from each other, and as this space increases, the abutment 66 is automatically actuated by the tripper 65 to open the valve 64 permitting air under pressure to escape from the inclined nozzles 62 and 63 from which emanate divergent streams of air which strike the matrices 39 and 44 so that the record, whether it is held by the stationary or movable die, is subjected to an air stream under pressure which causes a lifting action along the periphery thereof and then along its inner surface to dislodge it from the die to which it adhered, whereby, it automatically drops edgewise through the mouth and into the narrow channel of the rubber lined chute 70. In order to obviate the necessity of cycling the dies 35 and 40, which is conventional and involves the alternate use of steam and cold water, the temperature of these dies is maintained between approximately 150 and 170° F.

Thus, the record, as it reaches the chute 70 is in a somewhat soft and unstable condition so that if merely placed on a table to be cooled, it would in most cases warp. This record, as it reaches the chute, is in such a condition that it may readily be bent over on itself. As the record reaches the narrow channel of chute 70, it rolls along its inclined base and strikes the normally open switch element 112 and continues rolling along platform 80 to be located between the clamping jaws 76 and 78 and is kept from rolling thereout by the gate 82 which is normally maintained in closed position by the spring 84. The momentary closing of the switch 110 by the actuation of contact 112 causes energization of the holding coil 101, whereupon the switch 104 is closed and establishes the timer motor circuit, including the normally closed switch 108. This circuit is maintained until the holding coil cam at the end of its cycle of revolution interrupts the circuit by momentarily opening the switch 108, stopping the rotation of shaft 94 until the microswitch is tripped again by the next record. After the timer motor or holding circuit is established and the motor continues to drive, the record has now been delivered in the space between the clamping plates or jaws 76 and 78. Cam 97 closes the switch 121 energizing the winding 116 which moves the lever or actuator 159 of a four-way valve 151 to the right supply air under pressure to the left side of piston 79, while the right side is under exhaust thus forcing plate 76 towards 78 to maintain the record under pressure therebetween, while being cooled by these plates which are maintained in a cooled condition by circulating cold water through passages therein. After a pre-set time, during which said record is maintained under pressure and is cooled to about room temperature, cam 18 closes the normally open switch 119 to energize the solenoid 115 to move the core 120 in the opposite direction returning the lever to condition the four-way valve to its original condition, resulting in air under pressure being applied to the right side of piston 79 and the left side being under exhaust, whereby the pressure is removed from the record and the plate 76 is moved further away from the plate 78. Cam 96 now closes switch 99 to swing the lever 82 counter-clockwise to open gate 83 and to swing the ejector pin 85 against the edge of the record, whereupon, the record discharges from between said plates and deposits flatwise onto the moving belt. Cam 93 now momentarily opens switch 108 to break switch 104 by de-energization of coil 101 to complete the cycle. This cycle is automatically repeated upon the actuation of element 112 by each of the next succeeding records after its discharge from the machine 11.

For purposes of description, the injection moulding machine 11 may be regarded as a moulding station, the cooling clamp 75 as a cooling station and the chute 70 as conveyor or delivery means between said stations. The conveyor belt, shown in Figs. 2 and 4, may be said to be a receiving station. From the foregoing, it will be apparent that a product, such for example as the disc record, is first formed at the moulding station and then delivered to the cooling station by the chute and then is passed onto the conveyor after discharge from the cooling station.

I claim:

1. The combination of a machine for injection molding disc phonograph records comprising a fixed die and a movable die adapted to cooperate with each other to form a mold cavity in which one of said records may be formed, said fixed die having a material feed and sprue opening extending therethrough and centrally communicating with said mold cavity when formed, a reciprocable clamping ram, said movable die connected to and reciprocable with said clamping ram, an injection chamber, an injection plunger reciprocable in said injection chamber for feeding material from which said record is to be made through said feed and sprue opening and into said mold cavity when formed, and a ram rod connected to said clamping ram and being reciprocable with said clamping ram, said ram rod also being reciprocable relative to said clamping ram in a path substantially centrally through said mold cavity when formed and also said material feed and sprue opening to make a central opening through said record in said mold cavity and to force the sprue material into the discharge opening of said injection chamber; a cooling clamp adjacent the machine, a chute between the machine and cooling clamp, means for discharging said record from said machine into said chute and clamp and means for maintaining the cooling clamp under pressure cooling the record supported therebetween.

2. The combination of a machine for injection molding disc phonograph records comprising a fixed die and a movable die adapted to cooperate with each other to form a mold cavity in which one of said records may be formed, said fixed die having a material feed and sprue opening extending therethrough and centrally communicating with said mold cavity when formed, a reciprocable clamping ram, said movable die connected to and reciprocable with said clamping ram, an injection chamber, an injection plunger reciprocable in said injection chamber for feeding material from which said record is to be made through said feed and sprue opening and into said mold cavity when formed, and a ram rod connected to said clamping ram and being reciprocable with said clamping ram, said ram rod also being reciprocable relative to said clamping ram in a path substantially centrally through said mold cavity when formed and also said material feed and sprue opening to make a central opening through said record in said mold cavity and to force the sprue material into the discharge opening of said injection chamber; means for discharging said record from said machine, and clamping and cooling means for maintaining under pressure and for cooling the record discharged from said machine, and means for receiving said record from said machine and for guiding said record to said cooling and clamping means, said receiving and guiding means located below the level of said dies and with its inlet end located adjacent the space between said dies when said dies are apart.

3. The combination of a machine for injection molding disc phonograph records comprising a fixed die and a movable die adapted to cooperate with each other to form a mold cavity in which one of said records may be formed, said fixed die having a material feed and sprue opening extending therethrough and centrally communicating with said mold cavity when formed, a reciprocable clamping ram, said movable die connected to and reciprocable with said clamping ram, an injection chamber, an injection plunger reciprocable in said injection chamber for feeding material from which said record is to be made through said feed and sprue opening and into said mold cavity when formed, and a ram rod connected to said clamping ram and being reciprocable with said clamping ram, said ram rod also being reciprocable relative to said clamping ram in a path substantially centrally through said mold cavity when formed and also said material feed and sprue opening to make a central opening through said record in said mold cavity and to force the sprue material into the discharge opening of said injection chamber; means for discharging said record from said machine, and clamping and cooling means for maintaining under pressure and for cooling the record discharged from said machine, and a chute for receiving said record from said machine and for guiding said record to said cooling and clamping means, the inlet end of said chute disposed adjacent to and below the opening between said dies when said dies are apart and the outlet end of said chute disposed adjacent to said clamping and cooling means to guide said records thereto in the travel of said record from said machine.

4. The combination of a machine for injection molding disc phonograph records comprising a fixed die and a movable die adapted to cooperate with each other to form a mold cavity in which one of said records may be formed, said fixed die having a material feed and sprue opening extending therethrough and centrally communicating with said mold cavity when formed, a reciprocable clamping ram, said movable die connected to and reciprocable with said clamping ram, an injection chamber, an injection plunger reciprocable in said injection chamber for feeding material from which said record is to be made through said feed and sprue opening and into said mold cavity when formed, and a ram rod connected to said clamping ram and being reciprocable with said clamping ram, said ram rod also being reciprocable relative to said clamping ram in a path substantially centrally through said mold cavity when formed and also said material feed and sprue opening to make a central opening through said record in said mold cavity and to force the sprue material into the discharge opening of said injection chamber; means for discharging said record from said machine, and clamping and cooling means for maintaining under pressure and for cooling the record discharged from said machine, and means for receiving said record from said machine and for guiding said record to said cooling and clamping means, said receiving and guiding means located below the level of said dies and with its inlet end located adjacent the space between said dies when said dies are apart, said clamping and cooling means including a stationary clamping jaw and a movable clamping jaw, means for actuating said movable jaw towards and away from said stationary jaw, means for controlling said jaw actuating means, means actuable by said record in its travel from said machine to the space between said jaws, said controlling means being operaable in response to the actuation of said actuable means by said record.

5. The combination of a machine for injection molding disc phonograph records comprising a fixed die and a movable die adapted to cooperate with each other to form a mold cavity in which one of said records may be formed, said fixed die having a material feed and sprue opening extending therethrough and centrally communicating with said mold cavity when formed, a reciprocable clamping ram, said movable die connected to and reciprocable with said clamping ram, an injection chamber, an injection plunger reciprocable in said injection chamber for feeding material from which said record is to be made through said feed and sprue opening and into said mold cavity when formed, and a ram rod connected to said clamping ram and being reciprocable with said clamping ram, said ram rod also being reciprocable relative to said clamping ram in a path substantially centrally through said mold cavity when formed and also said material feed and sprue opening to make a central opening through said record in said mold cavity and to force the sprue material into the discharge opening of said injection chamber; means for discharging said record from said machine, and clamping and cooling means for maintaining under pressure and for cooling the record discharged from said machine, and means for receiving said record from said machine and for guiding said record to said cooling and clamping means, said receiving and guiding means located below the level of said dies and with its inlet end located adjacent the space between said dies when said dies are apart, said clamping and cooling means including a stationary clamping jaw and a movable clamping jaw, means for actuating said movable jaw towards and away from said stationary jaw, means for controlling said jaw actuating means, means actuable by said record in its travel from said machine to the space between said jaws, said controlling means being operable in response to the actuation of said actuable means by said record, means for limiting the travel of said record reaching the space between said jaws, and means for ejecting said record from between said jaws.

6. In injection moulding machines, a moulding station comprising a pair of relatively movable dies, within and between which a product is adapted to be formed, a cooling station spaced outwardly and downwardly with respect to said moulding station, said cooling station comprising relatively movable clamps, a chute of channel cross-sectional form joining said stations for delivery of a moulded product from the dies, when in opened position, by gravity through said chute to position between said clamps of the cooling station, means for supporting the product under pressure between the clamps in the cooling period of the product, and means independent of said chute to deliver the cooled product from the clamps when in opened position.

7. In injection moulding machines, a moulding station comprising a pair of relatively movable dies, within and between which a product is adapted to be formed, a cooling station spaced outwardly and downwardly with respect to said moulding station, said cooling station comprising relatively movable clamps, a chute of channel cross-sectional form joining said stations for delivery of a moulded product from the dies, when in opened position, by gravity through said chute to position between said clamps of the cooling station, means for supporting the product under pressure between the clamps in the cooling period of the product, means independent of said chute to deliver the cooled product from the clamps when in opened position, and means comprising a plurality of air discharge nozzles on said relatively movable dies for freeing products from the dies when in opened position.

8. In injection moulding machines, a moulding station comprising a pair of relatively movable dies, within and between which a product is adapted to be formed, a cooling station spaced outwardly and downwardly with respect to said moulding station, said cooling station comprising relatively movable clamps, a chute of channel cross-sectional form joining said stations for delivery of a moulded product from the dies, when in opened position, by gravity through said chute to position between said clamps of the cooling station, means for supporting the product under pressure between the clamps in the cooling period of the product, means independent of said chute to deliver the cooled product from the clamps when in opened position, and switch means at the cooling station actuated by the product at said station for controlling operation of the moulding and cooling stations.

9. In injection moulding machines, a moulding station comprising a pair of relatively movable dies, within and between which a product is adapted to be formed, a cooling station spaced outwardly and downwardly with respect to said moulding station, said cooling station comprising relatively movable clamps, a chute of channel cross-sectional form joining said stations for delivery of a moulded product from the dies, when in opened position, by gravity through said chute to position between said clamps of the cooling station, means for supporting the product under pressure between the clamps in the cooling period of the product, means independent of said chute to deliver the cooled product from the clamps when in opended position, switch means at the cooling station actuated by the product at said station for controlling operation of the moulding and cooling stations, and a receiving station to which the product is delivered from said cooling station.

10. In injection moulding machines, a moulding station comprising a pair of relatively movable dies, within and between which a product is adapted to be formed, a cooling station spaced outwardly and downwardly with respect to said moulding station, said cooling station comprising relatively movable clamps, a chute of channel cross-sectional form joining said stations for delivery of a moulded product from the dies, when in opened position, by gravity through said chute to position between said clamps of the cooling station, means for supporting the product under pressure between the clamps in the cooling period of the product, means independent of said chute to deliver the cooled product from the clamps when in opened position, the clamps of the cooling station being water cooled, one of said clamps being stationary, the other clamp being movable, and fluid pressure means for actuating said movable clamp.

11. In injection moulding machines, a moulding station comprising a pair of relatively movable dies, within and between which a product is adapted to be formed, a cooling station spaced outwardly and downwardly with respect to said moulding station, said cooling station comprising relatively movable clamps, a chute of channel cross-sectional form joining said stations for delivery of a moulded product from the dies, when in opened position, by gravity through said chute to position between said clamps of the cooling station, means for supporting the product under pressure between the clamps in the cooling period of the product, means independent of said chute to deliver the cooled product from the clamps when in opened position, each die having a matrix forming therebetween a mould cavity for the product formed, and means substantially in alinement with adjacent surfaces of said cavity for discharging blasts of air onto the product when the dies open to free and discharge the product from the cavity.

12. The method of producing a thermoplastic phonograph record, comprising injecting heated thermoplastic material through the discharge opening of a heated injection nozzle into a pair of dies forming a record cavity, maintaining said dies under pressure in forming a record therein, cooling said dies, then separating the dies, then discharging said record from at least one of the dies, then delivering the record to position between a pair of cooling clamping jaws, then applying pressure to said jaws to clamp the record therebetween to maintain said record in a substantially flat condition, while being cooled, and then opening the clamping jaws and delivering the cooled record therefrom.

IVAN J. AMO.

References Cited in the file of this patent

UNITED STATES PATENTS

| Number | Name | Date |
|---|---|---|
| 1,199,449 | Burns | Sept. 26, 1916 |
| 1,215,784 | Enley | Feb. 13, 1917 |
| 1,520,214 | Thomson | Dec. 23, 1924 |
| 2,104,673 | Rieser | Jan. 4, 1938 |
| 2,209,141 | Schnell | July 23, 1940 |
| 2,289,524 | Smith et al. | July 14, 1942 |
| 2,297,596 | Westin | Sept. 29, 1942 |
| 2,298,044 | Dinzl | Oct. 6, 1942 |
| 2,305,433 | Kyle | Dec. 15, 1942 |
| 2,313,851 | Van Deventer | Mar. 16, 1943 |
| 2,332,937 | Schmidberger | Oct. 26, 1943 |
| 2,375,252 | Sayre | May 8, 1945 |
| 2,460,831 | Kovacs | Feb. 8, 1949 |
| 2,471,148 | Gale et al. | May 24, 1949 |